(No Model.) 2 Sheets—Sheet 1.
W. H. TOWLE.
GOVERNOR.
No. 546,040. Patented Sept. 10, 1895.
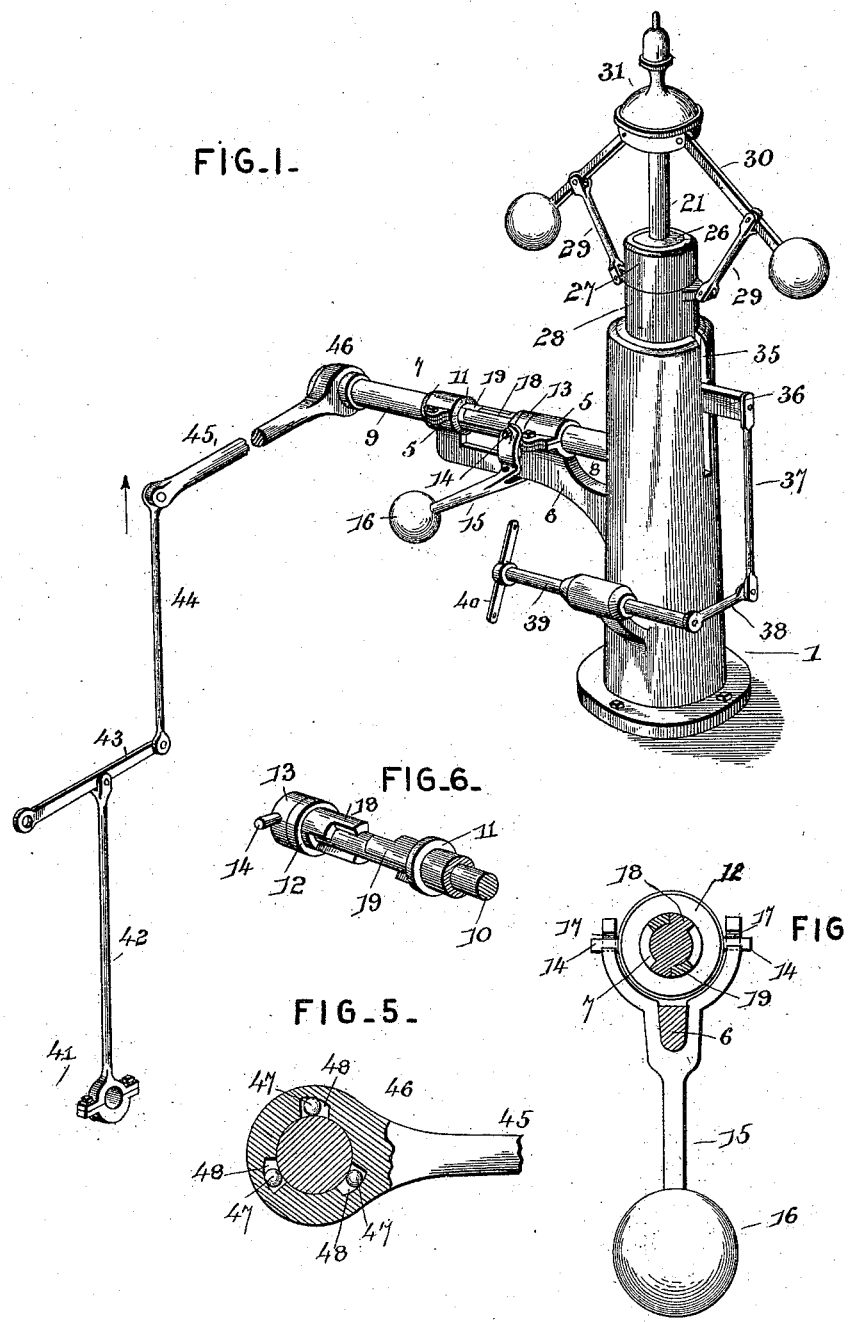
Witnesses
Jas. L. McCathran
Inventor
William H. Towle
By his Attorneys.
C. A. Snow & Co.

(No Model.) 2 Sheets—Sheet 2.
W. H. TOWLE.
GOVERNOR.
No. 546,040. Patented Sept. 10, 1895.
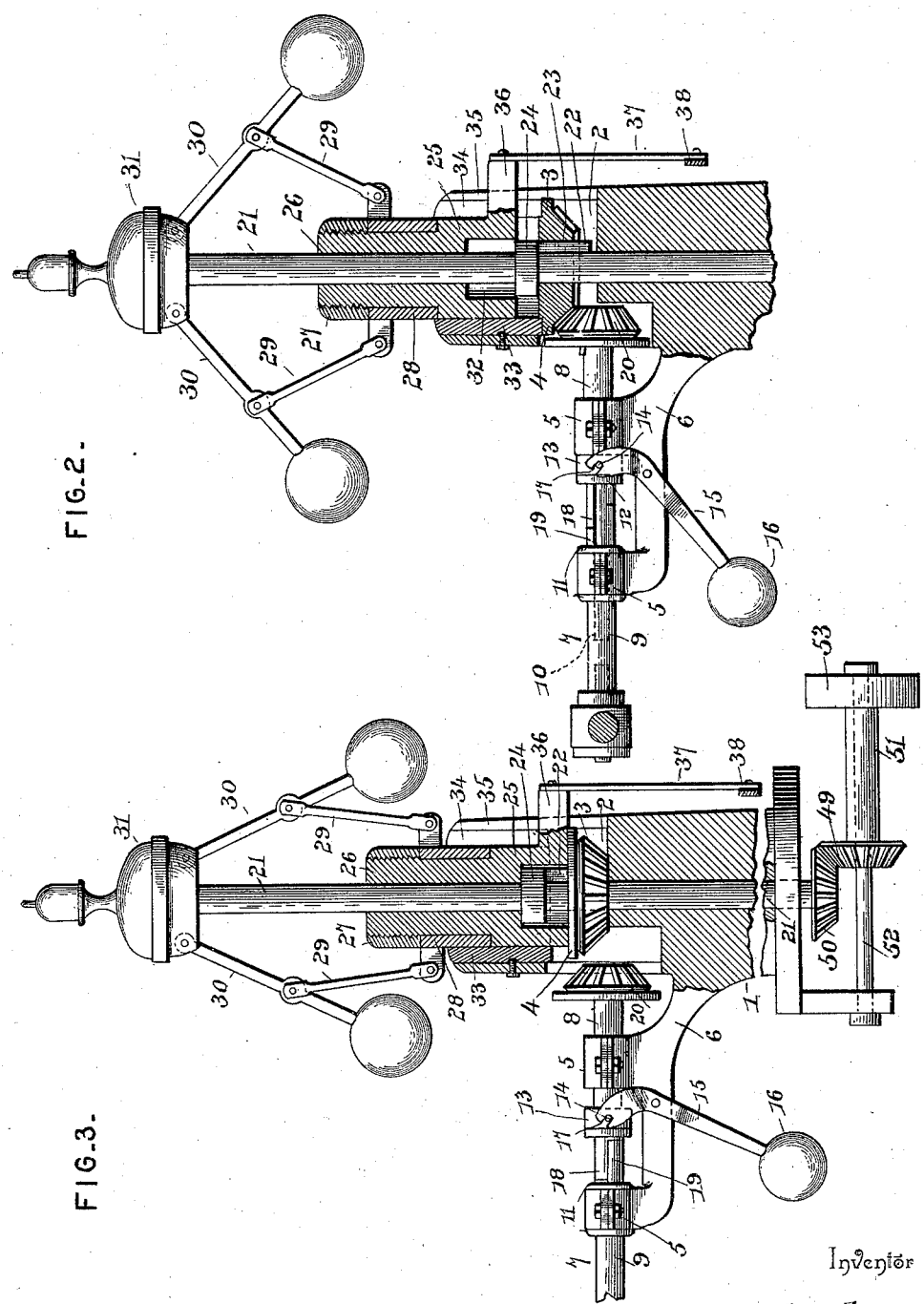
Witnesses
Jas. K. McCathran
Inventor
William H. Towle
By his Attorneys.
C. A. Snow & Co.

UNITED STATES PATENT OFFICE.

WILLIAM H. TOWLE, OF MINNEAPOLIS, MINNESOTA, ASSIGNOR OF ONE-FOURTH TO ALBERT CORNELL, OF SAME PLACE.

GOVERNOR.

SPECIFICATION forming part of Letters Patent No. 546,040, dated September 10, 1895.

Application filed February 15, 1895. Serial No. 538,568. (No model.)

*To all whom it may concern:*

Be it known that I, WILLIAM H. TOWLE, a citizen of the United States, residing at Minneapolis, in the county of Hennepin and State of Minnesota, have invented a new and useful Governor, of which the following is a specification.

My invention relates to governors, and has for its object to provide mechanism in connection with a governor whereby any temporary stoppage or interference with the motion thereof will cause the immediate operation of the cut-off valve, whereby the engine will be stopped.

Further objects and advantages of the invention will appear in the following description, and the novel features thereof will be particularly pointed out in the appended claims.

In the drawings, Figure 1 is a perspective view of a governor constructed in accordance with my invention. Fig. 2 is a vertical central section, partly in side view, showing the disposition of the parts when the governor is running under normal conditions. Fig. 3 is a similar view showing the disposition of the parts when, by reason of a partial or complete stoppage of the governor proper, the clutch has been thrown into such a position as to disconnect the governor and cut off steam. Fig. 4 is a detail transverse section through the clutch whereby the members of the section or shaft are connected. Fig. 5 is a detail view of the roller-clutch for communicating motion from the oscillating arm to said section or shaft. Fig. 6 is a detail view in perspective of the clutch indicated in Fig. 4, the members thereof being separated.

Similar numerals of reference indicate corresponding parts in all the figures of the drawings.

1 designates the standard of a governor, which is provided near its upper end with a cylindrical seat 2, adapted for the reception of a beveled gear 3, said beveled gear having a fixed disk 4 of greater diameter than the gear and equal in diameter to the interior of the seat, and mounted in bearings 5 on a lateral bracket 6 supported by the standard is a horizontal shaft 7. This shaft comprises telescoping members 8 and 9, the former of which is provided with a reduced extension 10, which fits in the bore of the tubular member 9. Said tubular member is provided on opposite sides of the bearing in which it is mounted with collars 11 to prevent longitudinal movement, and the member 8 is provided with a fixed collar 12, with which co-operates a sliding collar 13, connected by lateral trunnions 14 to the arms of a bifurcated shifting-lever 15, provided with a terminal weight 16. The arms of said bifurcated lever are provided with notches 17 in which said trunnions 14 are engaged. The member 8 of the shaft 7 is adapted to slide in its bearing, and it is provided with a clutch member 18 to engage a corresponding clutch member 19 on the member 9 of said shaft. The clutch members have stepped or shouldered interlocking tongues, whereby when the members are extended, as shown in Fig. 2, rotary motion may be communicated from the member 8 to the member 9; but by turning the member 9 independently of the member 8 in the direction indicated by the arrow in Fig. 1 the clutch members are arranged in such relative positions as to assume the position shown in Fig. 3, as will be more fully described hereinafter. The shaft member 8 is provided at its extremity with a beveled gear 20, which is adapted to mesh with the gear 3 when the parts are in the positions shown in Fig. 2 and the clutch members are extended; but when the clutch members have been relatively adjusted to cause the contraction of the shaft 7 the gear 20 is withdrawn from engagement with the gear 3, and the latter is allowed to drop vertically in the seat 2.

21 represents the vertical spindle of the governor, which fits in a central opening of the gear 3, and is provided with a feather 22 to engage a groove 23 in said gear, whereby the gear and spindle turn simultaneously and the former is allowed to slide independently of the latter. Fixed to the spindle 21, above the plane of the gear 3, is a collar 24, which rests upon the feather 22 and thereby supports the spindle, as shown in Fig. 2, and mounted to slide upon the spindle above said collar is the sleeve 25, having a reduced portion 26, upon which is threaded a nut 27, a loose sleeve 28 being mounted upon the reduced portion 26 of the sleeve and being held in place by said nut 27. This loose collar is connected by means of links 29 with the weighted governor-arms 30, which are pivotally connected to the head 31. The lower portion of the bore of the sleeve 25 is enlarged, as shown at 32, to allow the collar to extend upward thereinto when the weighted arms are in their lowered position. The downward movement of the sleeve 25 is limited by the gear 3, upon which the lower end of said sleeve rests, and the extent of downward movement of the sleeve is increased when the gear 3 descends in the seat, as hereinafter more fully explained. Upward displacement of the gear 3 is prevented by a bushing 33, fitted in the upper end of the seat 2, and said bushing and the side of the seat are provided with registering vertical slots 34 and 35, respectively, for the reception of a lateral arm 36 on the sleeve 25, said lateral arm being connected by means of a link 37 with the extremity of a crank-arm 38 on the rock-shaft 39, this rock-shaft having a cross-head 40, which is connected by any suitable means (not shown) with the cut-off valve of the engine.

In Fig. 1 I have indicated in diagram the eccentric 41 of an engine, the eccentric-rod 42, which is connected therewith, being attached to a lever 43, and the latter is in turn connected by means of a link 44 with a swinging arm 45, swiveled upon the extremity of the shaft member 9. The connection between said arm 45 and the shaft member 9 is accomplished by means of a clutch 46, preferably of the ball or roller type, and having balls or rollers 47, arranged in tapered pockets 48, whereby when the arm 45 is swung in a direction indicated by the arrow in Fig. 1 it will communicate rotary motion to the shaft member 9, but which will turn loosely when swung in an opposite direction.

This being the construction of the apparatus, the operation thereof is as follows: The governor stem or spindle should be connected with the engine to rotate at a speed proportionate to that of the engine. The rotation of the stem or spindle is communicated by means of the gear 3, which is seated in the standard and is feathered to the stem or spindle, to the gear 20, the parts being in the positions illustrated in Fig. 2. The motion imparted by the stem or spindle through said intermeshing gears to the shaft 7 is of a speed slightly in excess of that of the swinging arm 45, which receives its motion from an eccentric of the engine, and whereby the clutch by which connection is made between the shaft member 9 and the swinging arm 45 is maintained inoperative. If, however, any stoppage of the governor occurs or any impediment is offered to the rotation thereof, the arm 45 will by means of its clutch communicate rotary motion to the shaft member 9, in the direction indicated by the arrow in Fig. 1, thus altering the relative positions of the clutch members which connect the shaft members, and by aligning the tongues thereof with the openings provided for their reception will allow the shifting-lever 15 to move the shaft member 8 longitudinally to disengage the gear 20 from the gear 3. This allows the gear 3 to drop to the bottom of the seat in which it is mounted, and thus allows the sleeve with its connected parts to descend and communicate motion to the rock-shaft 39, such motion being sufficient to cut off the steam.

Rotary motion is communicated to the spindle 21 from the mechanism in connection with which the governor is used by means of a bevel-gear 49, meshing with a similar gear 50 on the spindle, said gear 49 being carried by a sleeve 51 mounted upon a stub-shaft 52 and driven by a pulley 53, said pulley being adapted to receive motion from a belt. (Not shown.) It is only by the extreme downward movement of the sleeve caused by the disengagement of the gears 3 and 20 that the cross-head 40 is turned sufficiently to cut off the steam. While said gears remain in engagement and the stem is thereby held in its normal or operative position, the upward movement of the sleeve operates the cross-head to cut off and the downward movement thereof to turn on the steam. The reason that the full downward movement of the sleeve cuts off the steam is that it turns the cross-head 40 beyond the point at which the full head of steam is turned on and to the point where the steam is cut off.

It will be understood that in practice various changes in the form, proportion, and minor details of construction may be resorted to without departing from the spirit or sacrificing any of the advantages of this invention.

Having described my invention, what I claim is—

1. The combination with a governor stem, a sliding sleeve connected to the cut-off valve of an engine, and centrifugal connections between the sleeve and stem, of a shaft mounted for rotation and having a longitudinally slidable member normally arranged in operative relation with the stem and having an intermeshing connection therewith to communicate rotary motion from the stem to the shaft, a clutch connection between the shaft members for holding the slidable member in operative relation with the stem, connections between the shaft and a moving part of the engine for communicating rotary motion to the shaft independently of the governor stem, when the movement of the latter is checked, to alter the relative positions of the shaft members and disengage the clutch members, and means for moving the slidable shaft member out of operative relation with the stem when the clutch members are disengaged, substantially as specified.

2. The combination with a governor stem, a sliding sleeve adapted to be connected to a cut-off valve, and centrifugal connections between the sleeve and stem, of a gear slidably mounted upon the stem and supporting said sleeve, a second gear meshing with the first mentioned gear and supporting the same, said second gear having rotary and axial or longitudinal movement, and means for withdrawing the second gear axially or longitudinally from engagement with the first-named gear when the motion of the stem is impeded, whereby said first-named gear and sleeve are allowed to drop substantially as specified.

3. The combination with a governor stem, a sliding sleeve adapted to be connected to a cut-off valve, and centrifugal connections between the sleeve and stem, of a gear slidably mounted upon said stem to support the sleeve, a second or supporting gear meshing with said slidable gear and supporting the same, a longitudinally movable shaft member supporting the second gear, and means for moving the shaft member longitudinally to withdraw the supporting gear from engagement with the slidable gear when the rotary motion of the governor stem is impeded, substantially as specified.

4. The combination with a governor stem, a sliding sleeve adapted to be connected to a cut-off valve, and centrifugal connections between the sleeve and stem, of a gear mounted to slide upon the stem, a second or supporting gear meshing with and supporting the first or slidable gear, a shaft having a longitudinally slidable member carrying the second or supporting gear, a clutch connecting the members of the shaft, means for adjusting the clutch members to allow longitudinal movement of the slidable shaft member when the movement of the governor stem is impeded, and a shifting lever connected to the slidable shaft member to move the second gear out of engagement with the gear on the stem, substantially as specified.

5. The combination with a governor stem, a sliding sleeve adapted to be connected to a cut-off valve, and centrifugal connections between the sleeve and stem, of a gear slidable upon the stem, a second or supporting gear meshing with and supporting the first or slidable gear, a shaft having a longitudinally slidable member carrying the second or supporting gear, clutch members carried, respectively, by the shaft members and adapted when aligned to allow longitudinal movement of the slidable clutch member and when out of alignment to connect the shaft members for rotary movement, a shifting lever operatively connected with the slidable shaft member, an oscillating arm adapted to be connected with the eccentric of the engine from which the governor receives motion, and a clutch connection between said arm and the said shaft, whereby when the rotation of the governor stem is impeded motion is communicated by said arm to the shaft and the said clutch members are aligned to allow longitudinal movement of the slidable shaft member, whereby the second or supporting gear is withdrawn from engagement with the gear which is mounted upon the governor stem, substantially as specified.

6. The combination with a governor stem, a sliding sleeve adapted to be connected to a cut-off valve, and centrifugal connections between the sleeve and stem, of a gear slidable upon the stem, a second or supporting gear meshing with and supporting the first or slidable gear, a shaft comprising stationary and slidable shaft members of which the latter carries said second or supporting gear, clutch members 18 and 19 secured, respectively, to the contiguous ends of the shaft members and adapted when in alignment to connect said members, whereby motion may be communicated from the slidable to the stationary shaft member, a weighted shifting lever operatively connected to the slidable shaft member, a swinging arm fulcrumed upon the stationary shaft member and adapted to be connected to and receive an oscillatory movement from the engine which imparts motion to the governor stem, and a clutch connection between said swinging arm and the stationary shaft member, whereby when the rotary movement of the governor stem is impeded said swinging arm imparts a partial rotary movement to the stationary shaft member and thereby aligns the clutch members connecting the shaft members and allows the slidable shaft member to be moved longitudinally by the shifting lever to disengage the intermeshing gears, substantially as specified.

In testimony that I claim the foregoing as my own I have hereto affixed my signature in the presence of two witnesses.

WILLIAM H. TOWLE.

Witnesses:
V. W. BAYLESS,
CHAS. B. BROOKS.